United States Patent
Hulsing, II

[11] Patent Number: 5,456,111
[45] Date of Patent: Oct. 10, 1995

[54] CAPACITIVE DRIVE VIBRATING BEAM ACCELEROMETER

[75] Inventor: Rand H. Hulsing, II, Redmond, Wash.

[73] Assignee: AlliedSignal Inc., Morris Township, N.J.

[21] Appl. No.: 185,630

[22] Filed: Jan. 24, 1994

[51] Int. Cl.[6] .............................................. G01P 15/125
[52] U.S. Cl. ............................................... 73/514.32
[58] Field of Search .................... 73/516 R, DIG. 4, 73/724, 718, 517 R, 517 B, DIG. 1, 517 AV, 862.59

[56] References Cited

U.S. PATENT DOCUMENTS

| | | | |
|---|---|---|---|
| 3,089,343 | 5/1963 | Rule | 73/516 R |
| 3,611,809 | 10/1971 | Cantat et al. | 73/517 AV |
| 3,709,042 | 1/1973 | Lee et al. | 73/516 R |
| 4,764,244 | 8/1988 | Chitty et al. | 156/630 |
| 4,805,456 | 2/1989 | Howe et al. | 73/517 AV |
| 4,872,343 | 10/1989 | Peters et al. | 73/517 AV |
| 4,901,586 | 2/1990 | Blake et al. | 73/517 AV |
| 4,928,203 | 5/1990 | Swindal et al. | 73/517 AV |
| 4,945,765 | 8/1990 | Roszhart | 73/517 AV |
| 4,945,773 | 8/1990 | Sickafus | 73/862.59 |
| 4,999,735 | 3/1991 | Wilner | 73/718 |
| 5,005,413 | 4/1991 | Novack et al. | 73/517 AV |
| 5,023,749 | 6/1991 | Hubert et al. | 73/517 AV |
| 5,090,254 | 2/1992 | Guckel et al. | 73/517 AV |
| 5,165,279 | 11/1992 | Norling et al. | 73/517 AV |
| 5,203,208 | 4/1993 | Bernstein | 73/505 |
| 5,353,641 | 10/1994 | Tang | 73/517 R |

Primary Examiner—Hezron E. Williams
Assistant Examiner—Christine K. Oda
Attorney, Agent, or Firm—Howard G. Massung

[57] ABSTRACT

A micromachined vibrating beam accelerometer provides an acceptable mechanical Q at pressures above vacuum. Electrodes are formed on the beams for connection to a source of excitation voltage. In addition, electrodes are formed on a pick-off capacitance plate disposed adjacent the vibrating beams. The electrodes formed on the pick-off capacitance plate form capacitors with the electrodes formed on the beam. The output signals from these capacitors are connected in a feedback loop to the source of excitation voltage to form a relatively simple oscillator. In order to reduce the squeeze film damping, the pick-off capacitance plate is formed with grooves along one edge adjacent the vibrating beams. The grooves, which may be formed by either isotropic or reactive ion etching, reduce the squeeze film damping resulting from the vibratory motion to obviate the need to operate the vibrating beam accelerometer in a vacuum. As such, the vibrating beam accelerometer in accordance with the present invention is capable of providing an acceptable mechanical Q at pressures above vacuum, for example, up to one atmosphere. By obviating the need for the vibrating beams to operate in a vacuum, the cost of the housing for the accelerometer is significantly reduced.

9 Claims, 5 Drawing Sheets

CAPACITIVE DRIVE VIBRATING BEAM ACCELEROMETER

BACKGROUND OF THE INVENTION

1. Field of the Invention

The present invention relates to a vibrating beam accelerometer and, more particularly, to a vibrating beam accelerometer, adapted to be excited electrostatically, which obviates the need for a relatively expensive housing to maintain a nearly perfect vacuum relative to the vibrating beams.

2. Description of the Prior Art

Various vibrating beam accelerometers are known in the art. Examples of such accelerometers are disclosed in U.S. Pat. Nos. 4,872,343; 4,901,586 and 5,005,413, all assigned to the same assignee as the assignee of the present invention and herein incorporated by reference. Such vibrating beam accelerometers are responsive to acceleration forces in an axial direction with respect to the beams which causes either a tension or compression force on the beams which, in turn, causes a variation of the frequency of vibration of the beams. This variation in the vibration frequency of the beams, in turn, is used as a measure of the acceleration.

Normally, such vibrating beam accelerometers are externally excited to cause the beams to vibrate at a resonant frequency. The type of excitation depends on the particular material from which the accelerometer is formed. Vibrating beam accelerometers are known to be formed from crystalline quartz and silicon. The vibrating beam accelerometers formed from crystalline quartz are excited according to the piezoelectric properties of the quartz. In particular, in such embodiments, electrode patterns are deposited on the vibrating beams and excited with an external source of electrical power. An example of a piezoelectrically excited vibrating beam accelerometer is disclosed in co-pending U.S. patent application Ser. No. 07/978,264, filed on Nov. 18, 1992 by Brian L. Norling and entitled "FOUR BAR RESONATING FORCE TRANSDUCER", issued Nov. 22, 1994 as U.S. Pat. No. 5,367,217, herein incorporated by reference.

Vibrating beam accelerometers made from non-piezoelectric elements, such as silicon, are known to be excited either electrostatically or electromagnetically. However, there are various known problems with such accelerometers. For example, electromagnetically driven accelerometers require special electrical circuitry to enable the accelerometer to provide acceptable output signals over a relatively wide range of component manufacturing tolerances. Such circuitry requires a relatively large housing which increases the cost of the accelerometer. Electrostatically driven vibrating beam accelerometers, on the other hand, require a near perfect vacuum for proper operation. More specifically, squeeze film damping resulting from the vibratory action of the vibrating beams lowers the mechanical Q of the accelerometer. In order to optimize the mechanical Q, the vibrating beams are subjected to a vacuum to reduce the squeeze film damping. However, the housing for maintaining such a vacuum normally requires a leak rate on the order of $10^{-12}$ cc/sec. Such a housing is relatively expensive.

SUMMARY OF THE INVENTION

It is an object of the present invention to solve various problems in the prior art.

It is yet another object of the present invention to provide an electrostatically excited vibrating beam accelerometer with relatively simple electrical excitation circuitry.

It is yet a further object of the present invention to provide an electrostatically excited vibrating beam accelerometer which obviates the need for a near vacuum for proper operation.

Briefly, the present invention relates to a micromachined vibrating beam accelerometer which provides an acceptable mechanical Q at pressures above vacuum. Electrodes are formed on the beams for connection to a source of excitation voltage. In addition, electrodes are formed on a pick-off capacitance plate disposed adjacent the vibrating beams. The electrodes formed on the pick-off capacitance plate form capacitors with the electrodes formed on the beam. The output signals from these capacitors are connected in a feedback loop to the source of excitation voltage to form a simple oscillator. In order to reduce the squeeze film damping, the pick-off capacitance plate is formed with grooves along one edge adjacent the vibrating beams. These grooves, which may be formed by either isotropic or reactive ion etching, reduce the squeeze film damping resulting from the vibratory motion to obviate the need to operate the vibrating beam accelerometer in a vacuum. In an alternate embodiment of the invention, grooves may be formed in the beams as opposed to the pick-off capacitance plate. As such, the vibrating beam accelerometer in accordance with the present invention is capable of providing an acceptable mechanical Q at pressures above vacuum, for example, up to one atmosphere. By obviating the need for the vibrating beams to operate in a vacuum, the cost of the housing for the accelerometer is significantly reduced.

BRIEF DESCRIPTION OF THE DRAWING

These and other objects of the present invention will become readily understood with reference to the following detailed description and attached drawing, wherein.

DETAILED DESCRIPTION OF THE PREFERRED EMBODIMENT

The present invention relates to a micromachined electrostatically excited vibrating beam accelerometer. Such accelerometers are known to include a force transducer which includes two or more vibrating beams adapted to vibrate at a predetermined resonant frequency in response to an excitation voltage. Forces, such as acceleration, applied in a direction along the axis of the vibrating beams result in a change of the vibration frequency. This change in vibration frequency is used as a measure of the force or acceleration applied along the axis of the beams.

In order to enable a source of excitation voltage to be applied to the beams, electrodes are known to be deposited on the beams. In addition, a pick-off capacitance plate is normally disposed adjacent the beams to form capacitances with the electrodes deposited on the beams. The output signal from these capacitances is normally connected in a feedback loop back to the source of the excitation voltage in order to form an oscillator.

Figure 1:
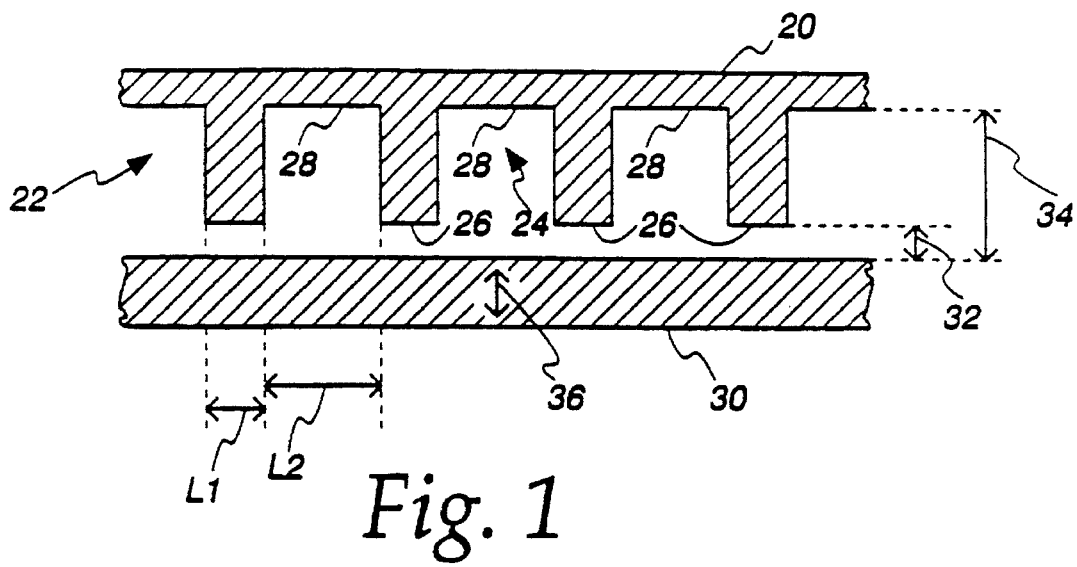
FIG. 1 is a partial cross-sectional view in elevation of a capacitance pick-off plate in accordance with the present invention, shown adjacent a vibrating beam.

The pick-off capacitance plate is located relative to the vibrating beams to cause the beams to vibrate 180° out of phase with respect to each other. For example, as illustrated in FIG. 1 of U.S. Pat. No. 4,901,586, assigned to the same assignee of the present invention, a vibrating beam accelerometer is shown which includes a force transducer having two vibrating beams. The pick-off capacitance plates are disposed in the same plane as the beams adjacent opposing edges. Such a configuration causes the vibrating beams to vibrate within the plane of the beams but 180° out of phase with respect to each other.

Figure 2:
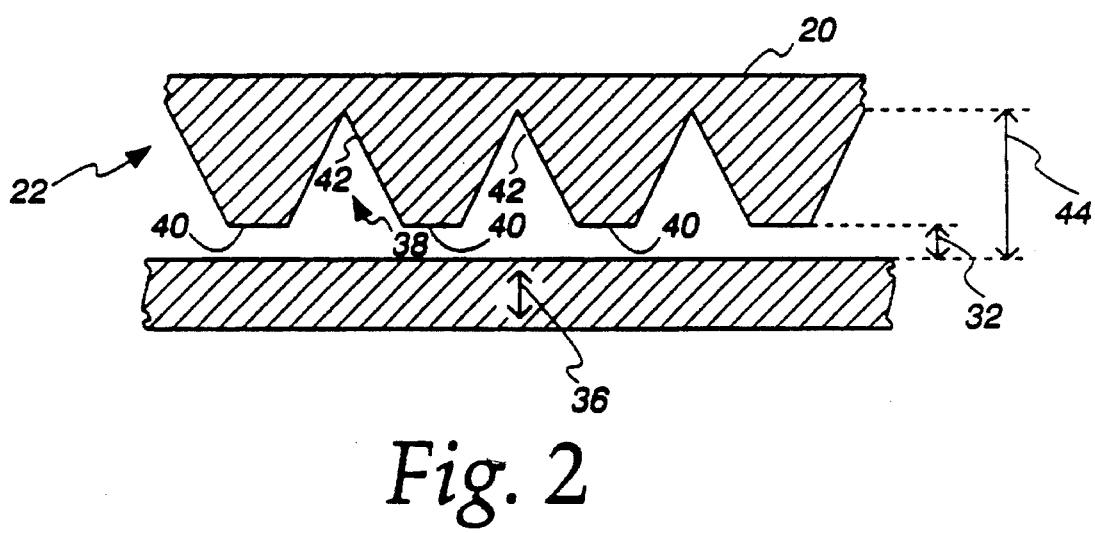
FIG. 2 is similar to FIG. 1 and illustrates an alternative embodiment of the capacitance pick-off plate illustrated in FIG. 1.
Figure 5:
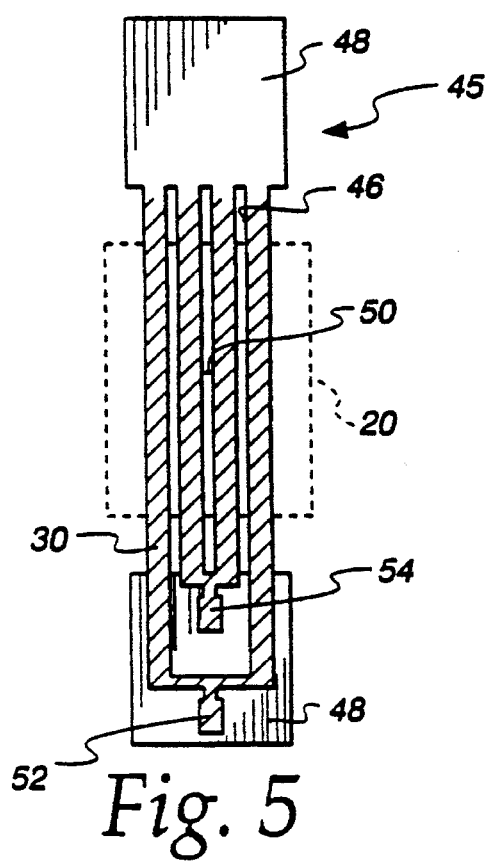
FIG. 5 is a plan view illustrating the electrode pattern on the vibrating beams relative to the capacitance pick-off plate in accordance with the present invention.

FIG. 5 illustrates an alternate configuration of a force transducer which includes four vibrating beams. Such a force transducer is disclosed in co-pending U.S. application Ser. No. 07/978,264, filed on Nov. 18, 1992, assigned to the same assigned as the assignee of the present invention. In this configuration, the pick-off capacitance plate is disposed in a plane below the plane of the vibrating beams. As such, the vibrating beams vibrate vertically as illustrated in FIGS. 1 and 2. As will be discussed in more detail below, excitation voltages of different polarities are applied to the inner and outer pairs of vibrating beams causing the inner pair of vibrating beams to vibrate 180° out of phase relative to the outer pair of vibrating beams.

As discussed above, in known electrostatically excited vibrating beam accelerometers, the vibration of the beams results in squeeze film damping which significantly reduces the mechanical Q of the accelerometer. This squeeze film damping is due to the vibrating action of the beams relative to the pick-off capacitance plate. In particular, in known electrostatically excited vibrating beam accelerometers, the pick-off capacitance plate is normally disposed to create a small gap, known to be less than 10 micrometers, relative to the vibrating beams. Such a configuration causes a substantial amount of squeeze film damping since the gap extends along a substantial portion of the beam. In order to improve the mechanical Q of the accelerometer and minimize the squeeze film damping, such accelerometers are operated in either a vacuum or extremely low pressures of, for example, less than 1/1000th of an atmosphere. In order to maintain such a low pressure or a vacuum for a relatively long period of time, for example, several years, in a relatively small volume of less than 1 cubic centimeter (cc), housings having leak rates of $10^{-12}$ cc/sec have been known to be used. Not only is it relatively difficult to provide a housing with such a leak rate, such housings are relatively expensive, which significantly increases the cost of the accelerometer.

An important aspect of the present invention is the configuration of the pick-off capacitance plate which allows operation of the vibrating beam accelerometer at up to 1 atmosphere with a reasonable mechanical Q. More particularly, the pick-off capacitance plate in accordance with the present invention, illustrated in FIGS. 1 and 2, is formed with a plurality of grooves along one side, adapted to be disposed adjacent the vibrating beams, to form a grooved pattern. In an alternate embodiment illustrated in FIG. 3, the vibrating beams are formed with grooves along one side, adjacent the capacitance plate. Such configurations reduce the squeeze film damping while providing a relatively acceptable capacitance value as will be discussed below.

Referring to FIG. 1, a pick-off capacitance plate in accordance with the present invention, generally identified with the reference numeral 20, is illustrated in partial section. In this embodiment, one side 22 of the plate 20 is formed with a plurality of generally rectangular grooves 24 defining damping portions 26 having a length L1 and alternative capacitive plate portions 28 having a length L2. The pick-off capacitance plate 20 is disposed adjacent a vibrating beam 30 to define a relatively small gap 32 between the damping portions 26 and the beam 30 and a relatively larger gap 34 between the capacitance plate portions 28 and the beam 30.

As indicated by the arrow 36, the vibrating beam 30 is adapted to vibrate in a vertical direction as discussed above. The relatively small length L1 of the gaps 32 between the damping portions 26 and the vibrating beam 30 substantially reduces the squeeze film damping relative to known configurations by providing a relatively shorter path (e.g., L1) for the gas to escape. However, the capacitance is only reduced by a relatively small factor. In particular, the capacitance plate portions 28 are formed to be relatively longer (e.g., L2) than the damping portions 26. As such, even though the gap 34 between the capacitance plates portions 28 is relatively larger than the gap 32, the increased length (L2) of the capacitive plate portions 28 relative to the length (L1) damping portions 26 only reduces the capacitance by a relatively small amount. More particularly, the squeeze film damping is known to be an inverse cubic function of size of the gap 32 while the capacitance is inversely proportional to the gap 34. As such, the combination of the damping portions 26 having a relatively shorter length L1 disposed at a relatively smaller gap 32 relative to the beam 30 with the relatively longer capacitance plate portions 28 disposed at relatively wider gaps 34 relative to the beam 30 provides for a relatively good capacitive drive and pick-off efficiency while reducing the squeeze film damping to an acceptable level. For example, with a configuration as shown, the capacitance is reduced less than 40% while the squeeze film damping is reduced by over 25 times.

An alternate embodiment of the invention is illustrated in FIG. 2. In this embodiment, the pick-off capacitance plate 20 is formed with a plurality of generally triangular grooves 38 along the side 22. These grooves 38 define damping portions 40 as well as triangular shaped capacitive plate portions 42. As in FIG. 1, the damping portions 40 are disposed at a relatively small gap 32 relative to the vibrating beam 30. The gap 44 between the vibrating beam 30 and the capacitive plate portions 42 is irregular as shown due to the triangular configuration of the grooves 38. However, similar to FIG. 1, the length of the damping portions 40 is formed to be relatively less than the distance between consecutive damping portions 40. As such, the squeeze film damping will be significantly reduced due to the relatively small length L1 (FIG. 1) of the gaps 32 between the respective damping portions 40 and the vibrating beam 30. Moreover, since the distance between the consecutive damping portions 40 is relatively longer than the distance of each damping portion, the reduction of the capacitance in this configuration is minimized.

Figure 3:
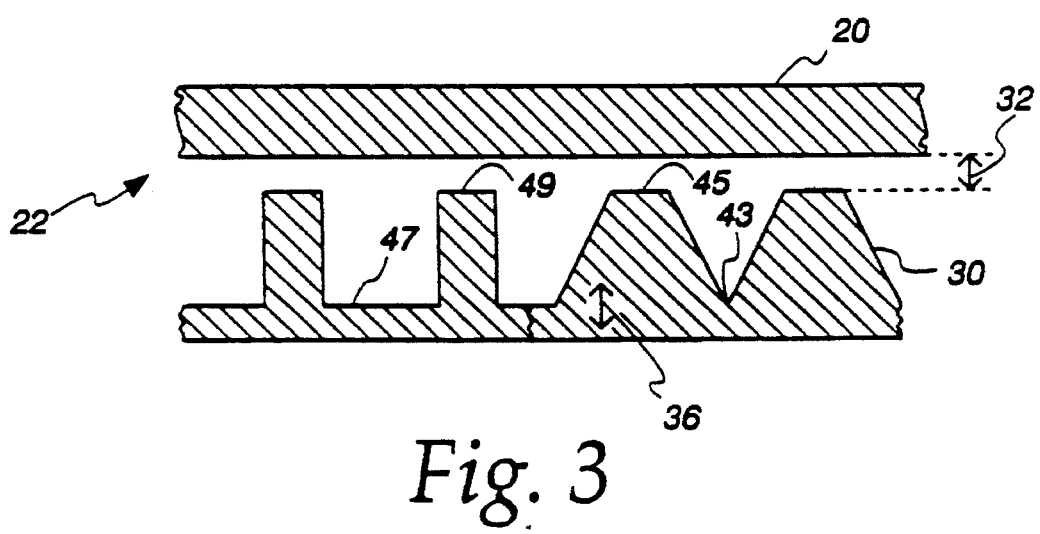
FIG. 3 is a split partial cross-sectional view in elevation of two alternate embodiments of the invention illustrated in FIGS. 1 and 2.

Two alternate embodiments of the invention illustrated in FIGS. 1 and 2 are illustrated in FIG. 3. In one embodiment, alternating generally triangular grooves 43 may be formed in the vibrating beam 30 as opposed to the capacitance plate 20. These grooves 43 define alternating damping portions 45 and are configured in a similar manner as the embodiment illustrated in FIG. 1. Alternatively, it is also contemplated that the vibrating beam 30 can be formed with alternating grooves 47 defining alternating generally rectangular damping portions 49 as shown in FIG. 3.

The grooves 24 for the embodiment illustrated in FIG. 1 can be fabricated by any isotropic etch or reactive ion etch. Electrodes are formed on the surface of the vibrating beam 30 adjacent the pick-off capacitance plate 20 as well as the capacitive plate portions 28 by depositing gold on an insulating surface, such as silicon oxide. In order to provide sufficient coverage of the gold on the capacitive plate portions 28, the pick-off capacitance plate 20 may be rotated during gold deposition.

The triangular grooves 38 for the embodiment illustrated in FIG. 2 can be formed by anisotropic etch, such as potassium hydroxide (KOH). Use of the anisotropic etch provides the advantage of forming its own etch stop along the planes of the silicon crystal substrate. In addition, the gold deposition can be done at one angle normal to the surface.

Both of the grooves 24 and 38 are etched into a pick-off capacitance plate 20 after the proper damping gap 32 (normally less than 10 μm) has been formed. Preferably, in order to obtain near optimum signal transfer, the pick-off capacitance plate 20 should be formed and disposed to be adjacent to the central 60% to 80% of the length of the vibrating beam 30 depending on stray capacitance. In addition, for optimum performance, the length L1 of the damping portions 26 and 40 should be formed to be ⅓ the width of the beam 30, while the length L2 of the grooves 24 and 38 should be formed to be about ⅔ the width of the beams 30 and the ratio of the spacing between grooves 24 or 38 (e.g., L2) dampening portion 26 width should be 2:1. Moreover, the use of gold on an oxide layer eliminates the problem of leakage current inherent in some known vibrating beam accelerometers at relatively high temperatures. As such, the vibrating beam accelerometers formed with the pick-off capacitance plates 20 in accordance with the present invention are adapted to provide good performance at high temperatures.

Figure 4:
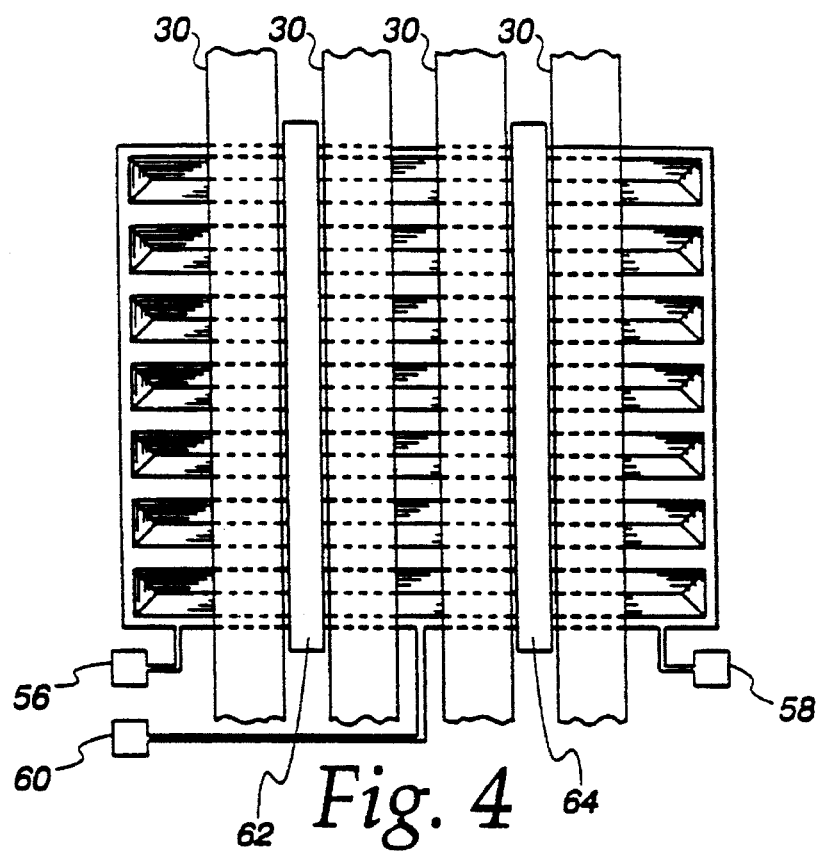
FIG. 4 is a partial plan view illustrating the electrode pattern on the capacitance pick-off plate relative to the vibrating beams in accordance with the present invention.

The configuration of the electrodes is illustrated in FIGS. 4 and 5. In particular, FIG. 4 illustrates the electrodes formed on the pick-off capacitance plate 20 while FIG. 5 illustrates the electrodes formed on the vibrating beams 30. Both FIGS. 4 and 5 illustrate the positioning of the pick-off capacitance plate 20 relative to the vibrating beams 30.

As shown in FIG. 4, the pick-off capacitance plate 20 is formed with the triangular grooves 38 illustrated in FIG. 2. Moreover, the force transducer is illustrated with four beams as described in detail in U.S. patent application Ser. No. 07/978,264 filed on Nov. 18, 1992.

Referring first to FIG. 5, a force transducer 45 is illustrated, formed with four vibrating beams or tines 30, generally spaced apart by a gap 46 and disposed to be parallel to one another. The opposing ends of the tines 30 are joined together by way of mounting pad portions 48. The inner vibrating beams 30 are synchronized by way of a cross-coupling member 50 in order to prevent undesirable modes of operation, for example, the inner pairs of beams 30 vibrating out of phase with respect to each other.

The formation of the electrodes on the vibrating beams 30 is illustrated in FIG. 5. In particular, gold is deposited on the outer pair of vibrating beams 30 along their length as shown. The gold deposition is continued at one end on the mounting pad portion 48 to form an electrode 52 for the outer pair of vibrating beams 30. In a similar manner, gold is deposited on the inner pair of vibrating beams 30 along their length. The gold deposition is continued on one end along the mounting pad portion 48 to form a separate electrode 54 for the inner pair of vibrating beams 30. These separate electrodes 52 and 54 are formed on the inner and outer pairs of vibrating beams 30 to enable the inner and outer pairs of vibrating beams 30 to vibrate 180° out of phase with respect to each other. In particular, as mentioned above, the application of an excitation voltage to the vibrating beams 30 will cause an attraction force relative to the pick-off capacitance plate 20. Since the pick-off capacitance plate 20 is in a plane below the plane of the vibrating beam 30, the vibrating beams 30 will vibrate in a direction as shown by the arrow 36 in FIG. 1 with the application of proper excitation voltages. As will be discussed in more detail below, a source of alternating current (AC) voltage is applied to one of the electrodes 52 or 54 while an inverted source of AC voltage is applied to the other electrode 52 or 54. As such, the inner pair of vibrating beams 30 will vibrate 180° out of phase relative to the outer pair of vibrating beams. In addition, as mentioned above, the inner vibrating beams 30 are tied together by way of the cross member 50 to assure that the inner vibrating beams 30 vibrate in phase with one another.

The method of forming the electrodes on the pick-off capacitance plate 20 is illustrated in FIG. 4. In particular, gold is deposited on the entire surface of the pick-off capacitance plate 20. In order to form effective capacitances relative to the four vibrating beams 30, gold is deposited on the pick-off capacitance plate 20 to correspond with the electrode configuration for the vibrating beams 30 in FIG. 5. In particular, three separate electrodes 56, 58 and 60 are formed on the pick-off capacitance plate 20. In order to provide separation between the electrodes 56, 58 and 60, either a mask can be used for deposition of the gold or trenches 62 and 64 can be etched along the length of the pick-off capacitance plate 20 at positions between the inner and outer vibrating beams 30. The etching can also be done prior to gold deposition using a reactive ion etch to enable gold deposition from one angle, generally normal to the surface. These trenches 62 and 64 enable the three separate electrodes 56, 58 and 60 to be formed. The electrodes 56 and 58 correspond to the electrodes formed on the outer pair of vibrating beams 30. The electrode 60 is adapted to correspond to the electrode formed on the inner pair of vibrating beams 30.

As shown in FIG. 5, approximately 60%–80% of the vibrating beams 30 are aligned with the area of gold deposition on the pick-off capacitance plate 20 in order to minimize the amount of effective stray capacitance. This proportion plays a significant role in the overall capacitance formed between the electrodes 56, 58 and 60 on the pick-off capacitance plate 20 and the electrodes 52 and 54 formed on the vibrating beams 30. For example, if the pick-off capacitance plate 20 covers the entire active length of the vibrating beams 30, the effective capacitance would be about 50%. However, if the effective stray capacitance was 30% of the entire vibrating beam 30 length, then the optimum signal would be obtained when the pick-off capacitance plate 20 covers about 60%–80% of the vibrating beam length 30. For an effective stray capacitance of 100%, the optimum coverage is about 80% of the active length of the vibrating beams 30. On the other hand, for zero stray capacitance, the optimum coverage of the pick-off capacitance plate is about 60%. The above-mentioned lengths maximize the output current that results from vibration of the electrodes.

Figure 6:
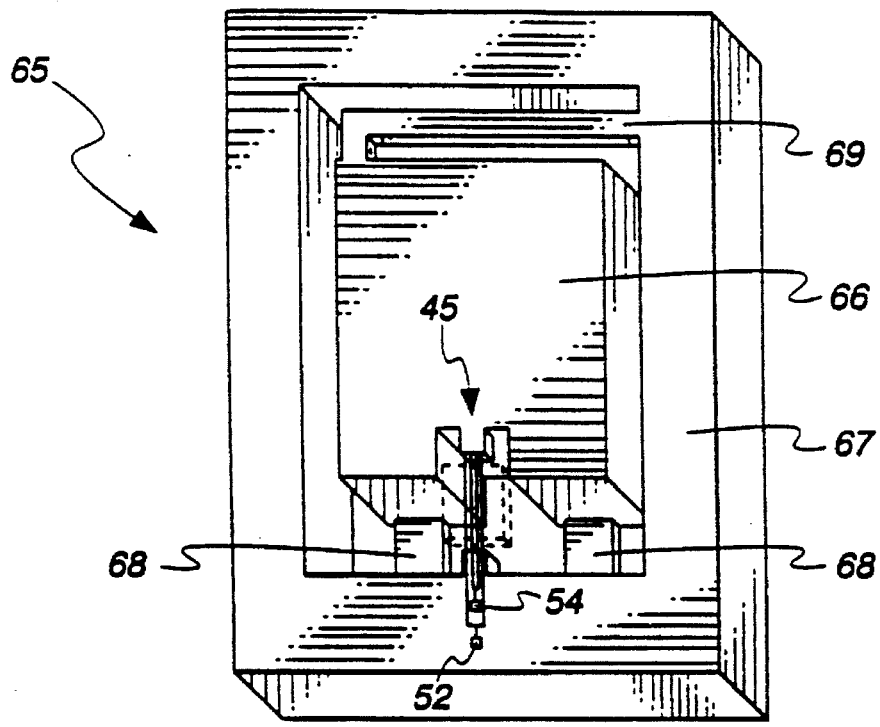
FIG. 6 is a perspective view of an accelerometer in accordance with the present invention.
Figure 7:
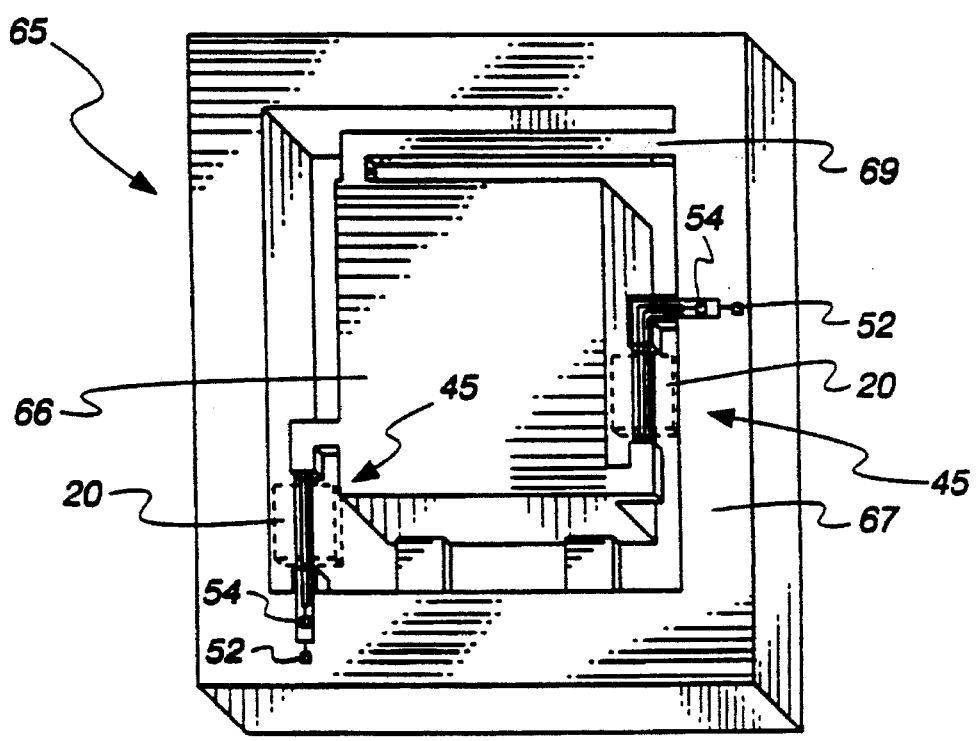
FIG. 7 is a perspective view of an alternative embodiment of the accelerometer illustrated in FIG. 6.

FIGS. 6 and 7 represent two exemplary accelerometers 65 in accordance with the present invention. Referring first to FIG. 6, the force transducer 45, which incorporates four vibrating beams, is connected between a pendulum 66 and an outer case 67 by way of a thin epitaxial layer. Two flexures 68 are connected between the outer casing 67 and the pendulum 66 to enable the pendulum 66 to rotate relative to the case 67. In addition, a strut 69 is disposed between the case 67 and the pendulum 66 to reduce torsional movement of the pendulum 66.

FIG. 7 illustrates a push-pull accelerometer. In this application two force transducers 45 are used to connect opposing sides of the pendulum 66 relative to the case 67. In this embodiment, two flexures 68 are used to connect the pendulum 66 to the outer case 67. Similar to the embodiment illustrated in FIG. 6, a strut 69 is formed between the casing 64 and the pendulum to reduce torsional movement of the pendulum 66. The push-pull accelerometer illustrated in FIG. 7 is described in more detail in U.S. Pat. No. 5,005,413, assigned to the same assignee as the assignee of present invention and incorporated herein by reference. In that patent, a push-pull accelerometer is shown which utilizes a pair of force elements which are formed from two vibrating beams 30. Co-pending application Ser. No. 08/151,410, filed on Nov. 12, 1993, by Rand H. Hulsing, II and entitled "DUAL PENDULUM VIBRATING BEAM ACCELEROMETER" herein incorporated by reference illustrates an application of a push-pull accelerometer which utilizes force elements having four vibrating beams 30. (see Appendix)

Both FIGS. 6 and 7 illustrate the pick-off capacitance plate 20 (shown in phantom) in accordance with the present invention disposed above the vibrating beams 30. In addition, the electrodes 52 and 54 formed on the vibrating beams 30 by gold deposition are also illustrated. As mentioned above, opposite polarity sources of AC voltage are applied to the electrodes 52 and 54 on the vibrating beams 30 which create attraction forces relative to the pick-off capacitance plate 20 to cause the vibrating beams to vibrate such that the outer pair of vibrating beams 30 vibrate 180° out of phase with respect to the inner pair of beams 30. In response to a force applied along the axis of the vibrating beams 30, for example, an acceleration, the pendulum 66 will rotate about the axis formed by the flexures 68 to cause the force transducers 45 to go into either tension or compression. More particularly, in the embodiment illustrated in FIG. 7, one of the force transducers 45 will go into compression while the other goes into tension in response to a force along the axis of the beams 30. As mentioned above, such forces change the frequency at which the beams vibrate. This frequency difference is then used as a measure of the force applied to the accelerometer 65 in an axial direction.

Figure 8:
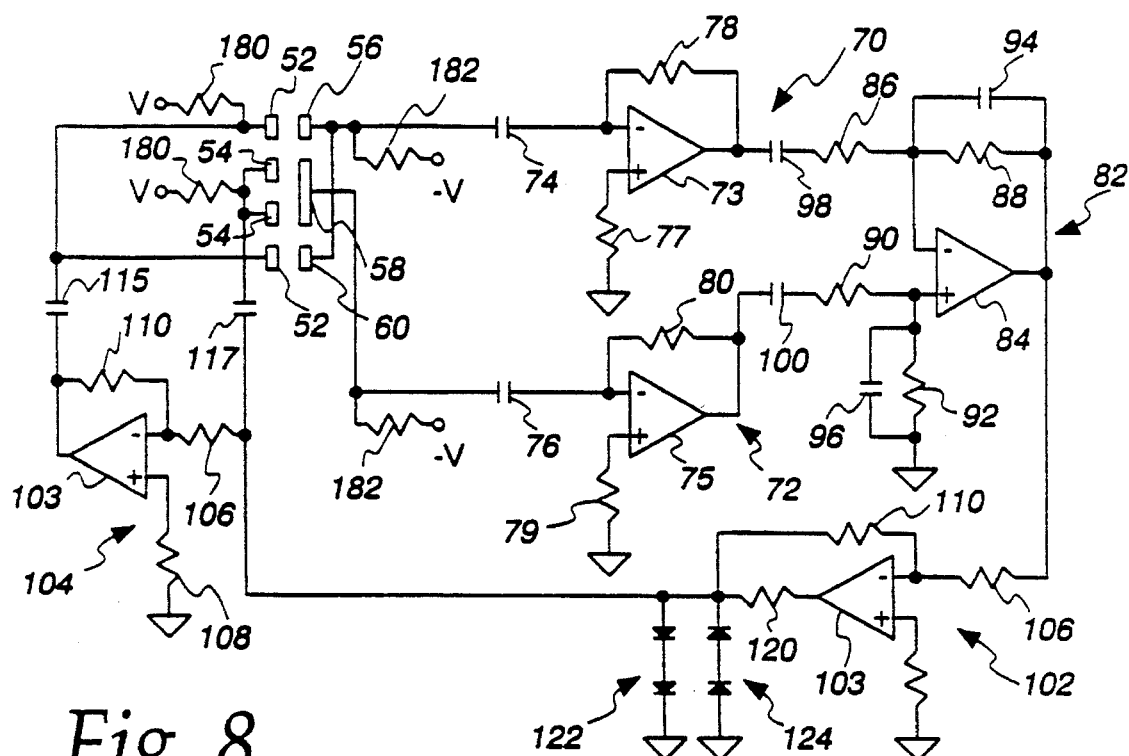
FIG. 8 is an electrical schematic diagram of a drive electronics circuit in accordance with the present invention.
Figure 9:
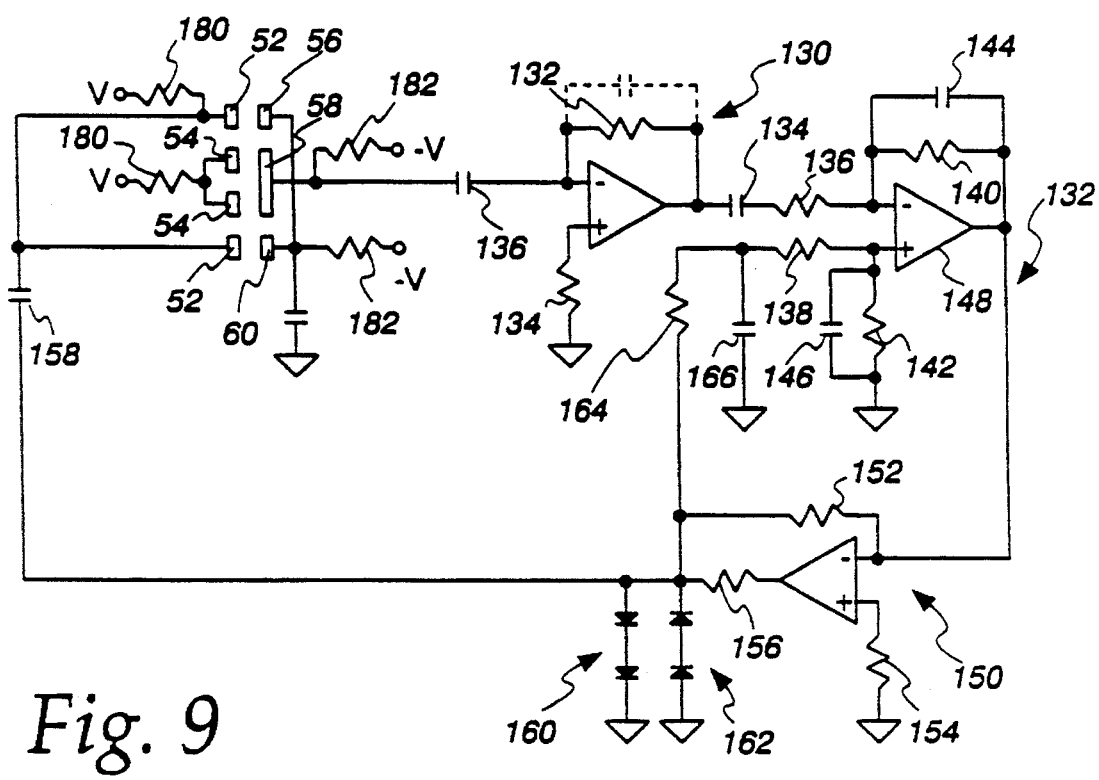
FIG. 9 is an electrical schematic diagram of an alternative embodiment of the drive electronics circuit illustrated in FIG. 8 in accordance with the present invention.

The drive electronics for the accelerometer 65 are illustrated in FIGS. 8 and 9. In particular, FIG. 8 represents an embodiment having full drive and full pick-off while FIG. 9 represents half drive and half pick-off. In particular in FIG. 8, the electrodes 52 and 54 for all of the beams 30 are driven separately. In addition, the electrodes 56, 58 and 60 are picked off separately. In FIG. 9, only the electrode 52 for one pair of the beams 30 is driven and only one electrode 58 on the plate 20 is picked off.

As shown in FIG. 8, the electrodes 52 and 54, formed on the vibrating beams 30, form capacitances with the corresponding electrodes 56, 58 and 60, formed on the pick-off capacitance plate 20. The output of these electrodes 56, 58 and 60 on the pick-off capacitance plate 20 is applied to two transimpedance amplifiers 70 and 72 by way of coupling capacitors 74 and 76. The transimpedance amplifiers 70 and 72, which include operational amplifiers 73 and 75, feedback resistors 78 and 80 and grounding resistors 77 and 79, are used to convert the output current from the electrodes 56, 58 and 60 to corresponding voltages. In particular, vibration of the vibrating beams 30 causes the distance or gap between the electrodes 56, 58 and 60 to vary with respect to the electrodes 52 and 54. This variance of the gap causes a corresponding variance in the output current from the electrodes 56, 58 and 60 on the pick-off capacitance plate 20. This output current from the pick-off capacitive plate 20 is then applied to the transimpedance amplifier 70 and 72 by way of the coupling capacitors 74 and 76 to remove any DC bias. The relatively high input impedance of the transimpedance amplifier 70 and 72 causes the output current from the electrodes 56, 58 and 60 to be dropped across the feedback resistors 78 and 80, thereby converting the output current from the pick-off capacitor plate electrodes 56, 58 and 60 to a corresponding voltage at the output of the transimpedance amplifiers 70 and 72. Since the vibrating beams 30 are out phase, the corresponding output currents and, hence the output voltages at the outputs of the transimpedance amplifiers 70 and 72 will likewise be out of phase.

The outputs of the transimpedance amplifiers 70 and 72 are coupled to a low pass filter 82, which includes an operational amplifier 84, resistors 86, 88, 90 and 92 and capacitors 94 and 96. The outputs of the transimpedance amplifiers 70 and 72 are coupled to the low pass filter 82 by way of coupling capacitors 98 and 100 to remove any remaining DC bias. The low pass filter 82 is used for subtracting out a quadrature signal from the output of the transimpedance amplifier 70 and 72 by way of applying the output signals from the transimpedance amplifiers 70 and 72 to the inverting and non-inverting inputs of the operational amplifier 84. In particular, the force transducer, illustrated with four vibrating beams 30, tends to have relatively large coupling capacitances between the center beam capacitance plates 58 and the outer beam capacitance plates 56 and 60 which generate a quadrature signal coupling capacitance between the drive voltage and the output capacitor current. If the values of the coupling are small, the quadrature signal has little effect on the drive circuit electronics. However, in certain situations, there could be as much as 25% coupling current into the output signal. In such a situation, the quadrature signal can be canceled with proper phasing from the pick-off signal using the drive signal shifted 90° with the low pass filter 82. This would also optimize the operation of the oscillator circuit by eliminating unnecessary voltage levels.

In order to create an oscillator, the signal at the output of the low pass filter 82 is fed back to the input electrodes 52 and 54, by way of a pair of amplifier circuits 102 and 104 which, as configured, provide drive signals of opposite polarities to the electrodes 52 and 54. Each amplifier 102, 104 contains an operational amplifier 103, an input resistor

106, a grounding resistor 108 and a feedback resistor 110. The amplification of each of the amplifiers 102 and 104 is determined by the ratio of the feedback resistor 110 to the input resistor 106. In order to form an oscillator, the overall loop gain must be greater than one. The output signals from the amplifiers 102 and 104 are fed back to the electrodes 52 and 54 by way of coupling capacitors 115 and 117 to form the oscillator.

A resistor 120 is used to limit the output current available at the output of the amplifier 102. The output current from the resistor 120, in turn, is fed to the amplifier 104 and is also fed back to the electrodes 52 along with the output from the amplifier 104 to form the oscillator. In order to provide voltage limiting, two pairs of serially connected diodes 122 and 124 are connected between the output resistor 120 and ground. The polarities of the diode pairs 122 and 124 are reversed since the outputs from transimpedance amplifiers 70 and 72 will be bipolar.

An alternative embodiment of the drive electronics circuit is illustrated in FIG. 9. In this embodiment, only the electrodes 52 corresponding to one pair of beams are driven. In addition, only one electrode 60 formed on the pick-off capacitance plate 20 corresponding to the inner pair of vibrating beams, is connected to the drive circuit. In this embodiment, the output of the electrode 60 is tied to a single transimpedance amplifier 130 which includes a feedback resistor 132 and a grounding resistor 134 by way of a coupling capacitor 136. As mentioned above, the output current from the electrode 60 is converted to a voltage by way of the feedback resistor 132. The output of the transimpedance amplifier 130 is applied to a low pass filter 133 by way of a coupling capacitor 135. The low pass filter 133 includes resistors 137, 138, 140 and 142, capacitors 144 and 146 and an operational amplifier 148. The output of the low pass filter 133 is connected to an amplifier 150 which includes a feedback resistor 152 and a grounding resistor 154. The output current from the amplifier 150 is limited by way of a resistor 156 and fed back to the electrodes 52 by way of a coupling capacitor 158 to form an oscillator. In addition, two pairs 160, 162 of serially connected diodes are connected between the output resistor 156 and ground to provide voltage limiting.

An important aspect of the half drive and half pick-off electronics circuit illustrated in FIG. 9 is the ability to provide cancellation of a quadrature signal resulting from stray capacitance. As mentioned above, force transducers with four vibrating beams tend to have relatively large coupling capacitances between the center capacitance plate 58 and the outer capacitance plates 56 and 60. In order to cancel the quadrature signal in the circuit illustrated in FIG. 9, the output signal from the low pass filter 132 is fed back into a non-inverting input of the operational amplifier 148 by way of the resistors 152, 164 and 138. A capacitor 166 coupled between the resistor 164 and ground provides a 90° phase shift.

Figure 10:
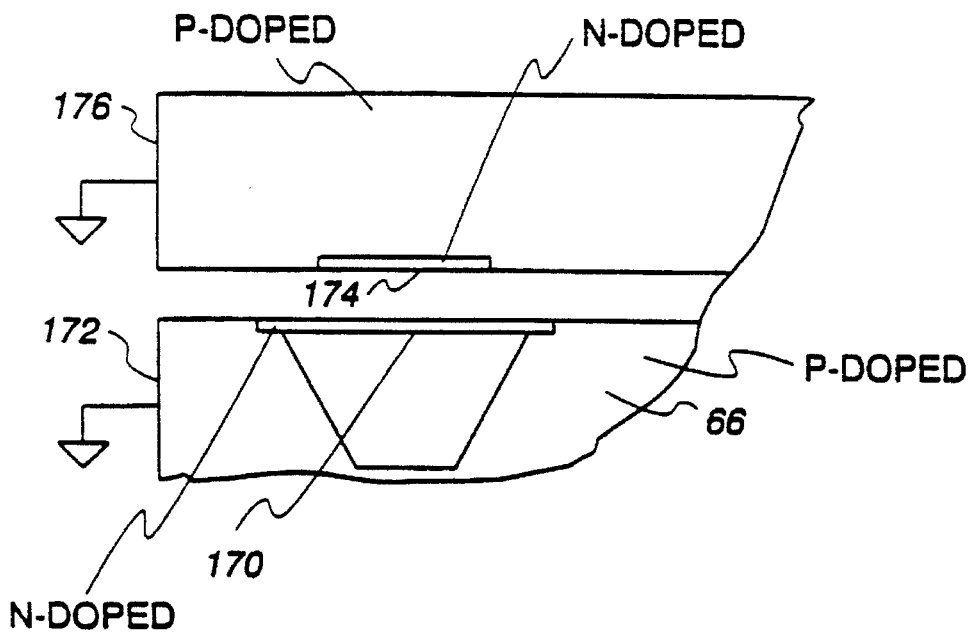
FIG. 10 is a partial sectional view of an alternate embodiment of the accelerometer in accordance with the present invention.
Figure 11:
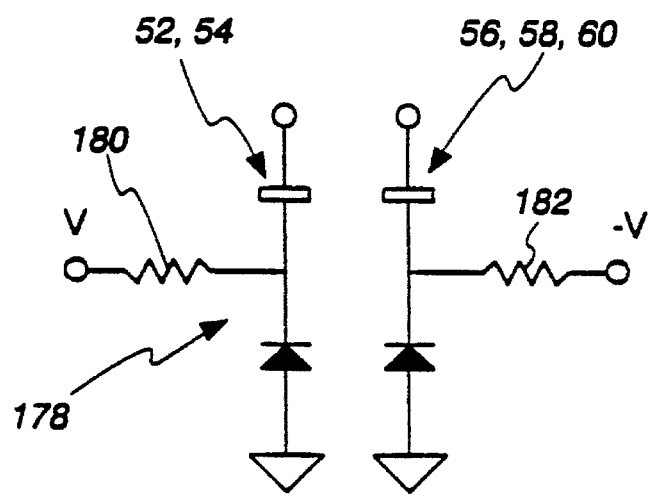
FIG. 11 is an electrical model of the structure illustrated in FIG. 10.

Stray capacitance between the beams 30 and the electrodes 56, 58 and 60 can be about 2.5 pF due to the conductivity of the silicon substrate connecting the isolated gold on the insulator islands. The effects of the stray capacitance can be mitigated by grounding the substrate of the pick-off capacitance plate 30. Alternatively, an island of opposite polarity can be doped in the substrate as shown in FIG. 10. For example, as shown in FIG. 10, the beams 30 could be formed of an N-doped island 170 in a P-doped substrate used to form the pendulum 66. Similarly, the electrodes 56, 58 and 60 can be formed in an N-doped island 174 within a P-doped substrate 176. Such a configuration forms a pair of back-to-back diodes 178 with their anodes connected to ground. In order to back bias the diodes 178, the cathodes may be biased with voltages V and −V through resistors 180, 181, and 182 and 183, respectively, as shown in FIGS. 8, 9 and 11. Such a configuration isolates the electrodes 56, 58 and 60 on the pick-off capacitance plate 20 from the beams 30 with, for example, a 1 pF capacitor to ground for each pair of beams 30. However, even though the gold on the insulator eliminates leakage current at high temperature, the back bias leakage current may increase. The drive electronic circuits in FIGS. 8 and 9 have taken this aspect into account since the transimpedance amplifiers 72 and 74 hold the electrodes 56, 58 and 60 at a virtual ground. Alternatively, as mentioned above, grounding the pick-off capacitance plate 20 results in the same isolation with about 6 pF of capacitance to ground.

Obviously, many modifications and variations of the present invention are possible in light of the above teachings. Thus, it is to be understood that, within the scope of the appended claims, the invention may be practiced otherwise than as specifically described above.

DUAL PENDULUM VIBRATING BEAM ACCELEROMETER

BACKGROUND OF THE INVENTION

1. Field of the Invention

The invention relates to an accelerometer for measuring accelerations along a sensitive axis and, more particularly, to a micromachined vibrating beam accelerometer formed with dual pendulums in one plane which compensates for errors due to cross-axis acceleration without the need for a special mounting structure.

2. Description of the Prior Art

Vibrating beam accelerometers are generally known in the art. An example of such an accelerometer is disclosed in U.S. Patent No. 5,005,413. Such an accelerometer is formed with a pair of vibrating beam transducers in one plane and configured in a push-pull arrangement such that accelerations along the sensitive axis will cause compression force on one of the vibrating beam transducers and a tension force on the other. The push-pull configuration provides for compensation of various common mode errors, such as vibration rectification errors and certain errors induced by temperature change and drift of the clock frequency. In order to optimize the compensation for the common mode errors, the force transducers must be formed to have nearly identical common mode responses. Various configurations are known for forcing the transducers to have nearly identical common mode responses.

For example, certain accelerometers, such as the accelerometer disclosed in the '413 patent, are formed by micromachining; a technique for fabricating accelerometers from a silicon substrate in a manner similar to the manner in which integrated circuits are fabricated. In order to form the transducers in such an accelerometer in a push-pull relationship, the transducers must be formed either in planes adjacent opposing surfaces of the silicon substrate or in one plane in order to create the push-pull configuration. However, there are various known problems with both alternatives.

In particular, accelerometers formed with vibrating beam transducers in planes adjacent opposing surfaces of the silicon substrate are known to not adequately compensate for common mode errors. The reason for this is that the transducers are formed from different physical layers of the silicon substrate. By forming the vibrating beam transducers in different physical layers of the silicon substrate, the transducers are known to not have well matched common mode responses.

In an attempt to solve this problem, the accelerometer disclosed in the '413 patent is formed with both vibrating beam transducers formed in one plane adjacent one surface of the silicon substrate. By forming both of the vibrating beam transducers in a single plane, the common mode responses of such transducers will be relatively well matched. However, such a configuration creates other problems. For example, such a configuration results in a small angular offset or tilting of the sensitive axis SA (e.g., 6°) which can cause errors in the accelerometer output signal due to cross-axis acceleration. In order to compensate for the tilting of the sensitive axis SA, it is known to mount such accelerometers with a special mounting structure that compensates for the tilting of the sensitive axis.

Although the problem relating to the tilting of the sensitive axis SA can be corrected by utilizing a special mounting structure, there is another problem with such a configuration that is not solved with the use of a special mounting structure. This problem relates to rotation of the sensitive axis SA as a function of the G input. This problem is best understood with reference to FIGS. 1 and 2, which illustrate the accelerometer disclosed in the '413 patent. In particular, the accelerometer 20 is formed with dual vibrating beam transducers 22 and 24 in a single plane adjacent a top surface 26 of the silicon substrate 28. A proof mass 30, formed along the width of the silicon substrate 28, is supported in a plane adjacent a bottom surface 32 of the silicon substrate 28 by a pair of flexures 34 and 36, which define a hinge axis HA. As best shown in FIG. 2, the pendulous axis PA is defined between the center of mass 38 of the proof mass 30 and the hinge axis HA. The center of mass 38 is approximately in the middle of the thickness of the silicon substrate 28 and, since the flexures 34 and 36 are formed along the bottom surface 32, the pendulous axis PA will not be parallel to the plane of the silicon substrate 28. Rather, the pendulous axis PA will be angularly offset or tilted relative to the plane of the silicon substrate 28 by a certain amount as shown, for example, 6°. Since the sensitive axis SA by definition is normal to the pendulous axis PA, the sensitive axis SA will be tilted relative to the plane of the silicon substrate 28 by the same amount.

As the proof mass 30 rotates about the hinge axis HA, the center of mass 38 will likewise rotate. Such rotation of the center of mass 38 will cause rotation of the pendulous axis PA in the plane of the pendulous axis PA and, consequently, will result in rotation of the sensitive axis SA. Such rotation of the sensitive axis SA will be a function of the G input. In some known accelerometers, the rotation of the sensitive axis SA can be on the order of 1 milliradian at maximum G input, resulting in relatively significant errors in the accelerometer output signal.

SUMMARY

It is an object of the present invention to solve various problems in the prior art.

It is another object of the present invention to provide a micromachined push-pull accelerometer.

It is yet another object of the present invention to provide a micromachined push-pull accelerometer formed with dual vibrating beam transducers formed in one plane of a silicon substrate which compensates for errors due to cross-axis acceleration.

It is yet a further object of the present invention to provide a micromachined push-pull accelerometer formed with dual vibrating beam transducers in one plane of a silicon substrate which obviates the need for a special mounting structure.

It is yet a further object of the present invention to provide a micromachined push-pull accelerometer which compensates for errors resulting from rotation of the sensitive axis.

Briefly, the present invention relates to a micromachined push-pull accelerometer formed with dual vibrating beam transducers in one plane of a silicon substrate which includes a pair of proof masses or pendulums supported by flexures formed in a plane adjacent a surface of the silicon substrate opposite the vibrating beam force transducers on opposing sides of the pendulums to define opposing pendulous axes. The accelerometer is configured such that the dual vibrating beam transducers are in a push-pull relationship (e.g., one transducer is subjected to a tension force while the other transducer is subjected to a compression force in response to accelerations along a sensitive axis SA). In order to form the push-pull configuration, one vibrating beam transducer is connected to one pendulum on a side opposite the hinge axis for that pendulum while the other vibrating beam transducer is connected to the other pendulum on the same side as the hinge axis for that pendulum. Such a configuration not only provides for cancellation of cross acceleration over a relatively wide frequency range but, in addition, provides an effective sensitive axis SA, generally perpendicular to the surface of the silicon substrate, thus obviating the need for a special mounting structure while obviating the problem relating to the rotation of the input axis. The configuration also enables the electrically conductive material for the electrodes to be deposited on one side of the substrate, thus simplifying the fabrication of the accelerometer.

BRIEF DESCRIPTION OF THE DRAWING

These and other objects of the present invention will be readily apparent from the following specification and attached drawing, wherein:

FIG. 1 is a perspective view of a known micromachined push-pull accelerometer as disclosed in U.S. Patent No. 5,005,413;

FIG. 2 is a cross-sectional view of the accelerometer illustrated in FIG. 1 taken along line 2-2 of FIG. 1;

FIG. 3 is a perspective view of micromachined push-pull accelerometer in accordance with the present invention;

FIG. 4 is a cross-sectional view of the accelerometer illustrated in FIG. 3 along line 4-4 of FIG. 3;

FIG. 5 is a cross-sectional view of the accelerometer illustrated in FIG. 3 along line 5-5 of FIG. 3;

FIG. 6 is a vector diagram illustrating the cancellation of the cross axis acceleration for the accelerometer illustrated in FIG. 3;

FIG. 7 is an alternate embodiment of a micromachined push-pull accelerometer in accordance with the present invention;

FIG. 8 is a cross-sectional view of the accelerometer illustrated in FIG. 7 along line 8-8 of FIG. 7; and FIG. 9 is a cross sectional view of the accelerometer illustrated in FIG. 7 along line 9-9 of FIG. 7.

DETAILED DESCRIPTION OF THE PREFERRED EMBODIMENT

FIG. 3 is a perspective view of one embodiment of the micromachined push-pull accelerometer in accordance with the present invention. The accelerometer, generally identified with the reference numeral 50, may be formed from a generally planar and rectangular silicon substrate 52 having an upper surface 54 and a lower surface 56 (FIGS. 3 and 4). The silicon substrate 52 is etched by conventional etching techniques to form a pair of proof masses or pendulums 58 and 60 having centers of mass 62 and 64, respectively. The proof masses 58 and 60 are attached to a portion of the silicon substrate 52 (which forms a support 66) by pairs of flexures 68 and 70. The pairs of flexures 68 and 70 are formed in a single plane or layer 72 of the silicon substrate 52 adjacent the lower surface 56. The flexures 68 and 70 enable the proof masses 58 and 60 to rotate with respect to the support 66 about hinge axes HA1 and HA2. Since the proof masses 58 and 60 are supported on opposite sides with respect to each other by the flexures 68 and 70, the hinge axes HA1 and HA2 will be generally parallel, but spaced apart, as shown in FIG. 3.

As best shown in FIGS. 4 and 5, a pendulous axis is defined for each of the pendulums 58 and 60. In particular, the pendulous axis PA1 is defined for the pendulum 58. This pendulous axis PA1 extends from the hinge axis HA1 through the center of mass 62 of the pendulum 58. Similarly, the pendulous axis PA2 extends from the hinge axis HA2 through the center of mass 64 of the pendulum 60. Since the pendulums 58 and 60 are supported on opposite sides with respect to each other, the pendulous axes PA1 and PA2 will extend in opposing directions as shown in FIGS. 4 and 5.

These pendulous axes PA1 and PA2 define sensitive axes SA1 and SA2, respectively. The sensitive axis SA1 for the pendulum 58 is perpendicular to the pendulous axis PA1 and to the hinge axis HA1. Similarly, the sensitive axis SA2 for the pendulum 60 is perpendicular to the pendulous axis PA2 and to the hinge axis HA2. Since the pendulous axes PA1 and PA2 extend in opposite directions, the sensitive axes SA1 and SA2 will likewise extend in opposite directions.

The configuration of the sensitive axes SA1 and SA2 causes the cross axis acceleration components to cancel at all G inputs which provides an effective sensitive axis that is generally perpendicular to the surface of the silicon substrate 52 which obviates the need for a special mounting structure and also solves the problem related to rotation of the sensitive axis. This is shown vectorially in FIG. 6. In particular, as will be discussed in more detail below, the pendulums 58 and 60 are attached to the support 66 with vibrating beam force transducers 74 and 76 as shown in FIG. 3. As such, when an acceleration $A_{IN}$ is applied in a direction generally perpendicular to the plane of the silicon substrate 52 as shown, the vibrating beam transducer 74 will go into tension while the vibrating transducer 76 goes into compression. As shown in FIG. 6, the acceleration of the pendulum 58 will be as represented by the vector A1, generally parallel to the sensitive axis SA1. This vector A1 includes a cross-axis acceleration $A_c$ component. However, this cross-axis acceleration component is canceled out due to the configuration of the accelerometer 50. In particular, the acceleration $A_{IN}$ results in an acceleration $A_2$ of the pendulum 60. Since the vibrating beam transducer 74 is in compression while the vibrating beam transducer 76 is in tension, this acceleration is negative, $-A_1$. This acceleration $-A_1$ also includes a cross-axis acceleration component $-A_c$. However, this acceleration component $-A_c$ is equal, but of opposite polarity, resulting in a cancellation of the cross-axis acceleration component $A_c$. By canceling the cross-axis acceleration components of the pendulums 58 and 60, the resulting acceleration $A_{SUM}$ will be generally perpendicular to the plane of the silicon substrate 52, thus providing an effective sensitive axis SA for the accelerometer 50 that is normally perpendicular to the plane of the silicon substrate 52. Since the effective sensitive axis SA is perpendicular to the plane of the silicon substrate 52, the need for a special mounting surface is eliminated. In addition, the configuration also solves the problem with respect to rotation of the sensitive axes since the cross-axis acceleration components will cancel for all G inputs.

The transducers 74 and 76 are formed as vibrating beam transducers which include a pair of beams which oscillate 180° out of phase with one another in the plane of the beams. Such transducers 74 and 76 are known as force-to-frequency transducers since a change in the force applied to the transducer will result in a change of the resonant frequency of the transducer. In particular, a tension force applied along an axis generally parallel to the beams will cause an increase of the resonant frequency while a compression force will generally decrease the resonant frequency.

Both vibrating beam force transducers 74 and 76 are formed in a single layer 77 of the silicon substrate 52 such that they are generally parallel to each other as well as parallel to their respective pendulous axes PA1 and PA2 and connected to a common leg 82 of the support 66. Not only does such a configuration provide virtually identical common response for the transducers 74 and 76, but additionally simplifies construction of the accelerometer 50 by enabling the pairs of electrodes 78 and 80 to be formed on one side of the substrate 52.

Due to the configuration of the pairs of flexures 68 and 70, the vibrating beam transducer 74 is disposed on the opposite side of the pendulum 58 as the hinge axis HA1, while the vibrating beam transducer 76 is disposed on the same side as the hinge axis HA2 for the pendulum 60. By so configuring the vibrating beam transducers 74 and 76 relative to the hinge axes HA1 and HA2, the transducers 74 and 76 will be in a push-pull relationship. In particular, as discussed above, an acceleration normal to the plane of the silicon substrate 52 in a direction out of the page with reference to FIG. 3 will cause the vibrating beam transducer 76 to go into tension and the vibrating beam transducer 74 to go into compression. Similarly, an acceleration applied in a direction generally perpendicular to the plane of the silicon substrate in a direction into the page with reference to FIG. 3 will cause the vibrating beam transducer 76 to go into compression, while the vibrating beam transducer 74 goes into tension, thus forming a push-pull relationship between the two transducers 74 and 76.

An alternate embodiment of the invention is shown in FIGS. 7 and 9. This accelerometer, generally identified with the reference numeral 100, is similar to the accelerometer 50 and includes a pair of proof masses or pendulums 102 and 104 that are attached to a silicon substrate 106 by two pairs of flexures 108 and 110, respectively. These pairs of flexures 108 and 110 are formed in a layer 112 of the silicon substrate 106 adjacent a bottom surface 134 of the substrate 106 defining hinge axes HA1 and HA2, respectively. The accelerometer 100 includes a pair of vibrating beam transducers 114 and 116 connected between a support 118 and the pendulums 102 and 104.

In order to prevent torsion about the respective pendulous axes PA1 and PA2 due to off-center position of the beams of the vibrating beam transducers 114 and 116, a pair of struts 120 and 122 are provided. The struts 120 and 122 are formed in a layer 123 adjacent a top surface 124 of the silicon substrate 106. These struts 120 and 122 are formed to be on a side of the pendulums 102 and 104 opposite the hinge axes HA1 and HA2, respectively. In order to accommodate the struts 120 and 122 and also to provide relatively well matched response to common mode errors for the transducers 114 and 116, the transducers 114 and 116 are attached between the support 118 and sides 126 and 128 of the pendulums 102 and 104, respectively, as shown in FIG. 7, adjacent the hinge axis HA2 unlike the accelerometer 50 wherein the transducers 74 and 76 are connected to span the hinge axis HA2. This configuration places the vibrating beam transducers 114 and 116 in a push-pull relationship similar to the transducers 74 and 76.

The accelerometers 50 and 100 shown in FIGS. 3 and 7 can be fabricated in a number of ways using conventional silicon micromachining techniques. For example, the silicon substrates 52 and 106 can be formed from a generally planer and rectangular substrate formed from a P-type material with surfaces oriented along various crystal planes. An N-type epitaxial layer 130 can be grown on the upper surfaces 54 and 124. A second N-type epitaxial layer 134 can be grown on the lower surfaces 56 and 112. The substrates 52 and 106 are then etched to form the structures illustrated in FIGS. 3 and 7, with electrochemical etch stops used to prevent etching of the force transducers 74, 76 and 114, 116 from the epitaxial layer 130 and the flexures 68, 70 and 108, 110 from the epitaxial layer 134, while deep etching of the bulk silicon is being performed.

Although the accelerometers 50 and 100 have been described utilizing vibrating beam force transducers, the principals of the present invention are also applicable to accelerometers which use other types of transducers, such as piezo-resistive strain gauges, piezoelectric transducers and surface acoustic wave transducers. In all embodiments, it is desirable to match the thermal coefficient of expansion of the transducers to the coefficient of expansion of the material from which the proof masses and supports are fabricated to minimize thermal restraints on the transducers. This is accomplished in silicon micromachined devices by controlling doping concentrations.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

What is claimed and desired to be secured by Letters Patent of the United States is:

1. A vibrating beam accelerometer, comprising:

a casing;

a pendulum;

a pair of flexures which enable said pendulum to rotate with respect to said casing;

a force transducer including at least two vibrating beams having a predetermined length, connected between said casing and said pendulum;

at least one first electrode formed on said beams;

a capacitance plate disposed adjacent said beams which includes at least one second electrode which corresponds to said first electrode formed on said beams; and means for minimizing squeeze film damping of said beams in order to enable the accelerometer to be operated at pressures greater than vacuum.

2. A vibrating beam accelerometer comprising a casing;

a pendulum;

a pair of flexures which enable said pendulum to rotate with respect to said casing;

a force transducer including at least two vibrating beams having a predetermined length, connected between said casing and said pendulum;

at least one first electrode formed on said beams;

a capacitance plate disposed adjacent said beams which includes at least one second electrode which corresponds to said first electrode formed on said beams; and means for minimizing squeeze film damping in order to enable the accelerometer to be operated at pressures greater than vacuum, wherein said minimizing means includes generally rectangular shaped grooves formed on said capacitance plate.

3. A vibrating beam accelerometer comprising a casing;

a pendulum;

a pair of flexures which enable said pendulum to rotate with respect to said casing;

a force transducer including at least two vibrating beams having a predetermined length, connected between said casing and said pendulum;

at least one first electrode formed on said beams;

a capacitance plate disposed adjacent said beams which includes at least one second electrode which corresponds to said first electrode formed on said beams; and means for minimizing squeeze film damping in order to enable the accelerometer to be operated at pressures greater than vacuum, wherein said minimizing means includes generally triangular shaped grooves formed on said capacitance plate.

4. A vibrating beam accelerometer, comprising:

a casing;

a pendulum;

a pair of flexures which enables said pendulum to rotate with respect to said casing;

a force transducer including at least two vibrating beams having a predetermined length, connected between said casing and said pendulum;

a least one first electrode formed on said beams;

a capacitance plate disposed adjacent said beams which includes at least one second electrode which corresponds to said first electrode formed on said beams; and means for minimizing squeeze film damping in order to enable the accelerometer to be operated at pressures greater than vacuum, wherein said minimizing means includes grooves formed on said vibrating beams.

5. A vibrating beam accelerometer as recited in claim 1, wherein said capacitance plate is disposed above said beams.

6. A vibrating beam accelerometer as recited in claim 1, wherein said capacitance plate is disposed below said beams.

7. A vibrating beam accelerometer comprising:

a casing;

a pendulum;

a pair of flexures which enable said pendulum to rotate with respect to said casing;

a force transducer including at least two beams connected between said casing and said pendulum;

at least one first electrode formed on said beams;

a capacitance plate disposed adjacent said beams which includes at least one second electrode which corresponds to said first electrode formed on said beams; and means for minimizing squeeze film damping, wherein said minimizing means includes grooves formed on said vibrating beams, said grooves formed with a width L1 and spaced apart by a width L2 and wherein said ratio of L2/L1 is 2:1.

8. A vibrating beam accelerometer as recited in claim 1, wherein said said capacitance plate is formed to cover a predetermined portion of said predetermined length of said beams.

9. A vibrating beam accelerometer comprising:

a casing;

a pendulum;

a pair of flexures which enable said pendulum to rotate with respect to said casing;

a force transducer including at least two beams, connected between said casing and said pendulum;

at least one first electrode formed on said beams;

a capacitance plate disposed adjacent said beams which includes at least one second electrode which corresponds to said first electrode formed on said beams; and means for minimizing squeeze film damping of said beams; wherein said capacitance plate is formed to cover a predetermined portion of said predetermined length of said beams, said predetermined portion being in the range between 60% and 80%.

* * * * *